United States Patent
Khanna et al.

(10) Patent No.: US 6,788,494 B2
(45) Date of Patent: Sep. 7, 2004

(54) DEFORMABLE RING CLAMPING DEVICE FOR WARP-FREE DISK STACK ASSEMBLY IN A DATA STORAGE DISK DRIVE

(75) Inventors: Vijayeshwar Das Khanna, Millwood, NY (US); Gordon James Smith, deceased, late of Rochester, MN (US), by Molly Smith, personal representative; Sri M. Sri-Jayantha, Ossining, NY (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 123 days.

(21) Appl. No.: 10/154,344

(22) Filed: May 23, 2002

(65) Prior Publication Data

US 2003/0218830 A1 Nov. 27, 2003

(51) Int. Cl.[7] .............................................. G11B 17/08
(52) U.S. Cl. ..................................................... 360/98.08
(58) Field of Search ........................... 360/98.03, 98.08, 360/99.12; 369/270

Primary Examiner—George J. Letscher
Assistant Examiner—Mark Blouin
(74) Attorney, Agent, or Firm—Laurence R. Letson

(57) ABSTRACT

A magnetic disk drive is provided with clamping rings that whenever nested will form an annular chamber to accommodate a toroidal ring which is deformable. As the clamping rings are progressively forcefully engaged by the clamping rings, the chamber is reduced in height and transmits the force of the top clamping ring to the bottom clamping ring in a uniform distribution and prevents the force of the bottom clamping ring from having non-uniformity of distribution. This action prevents magnetically recordable disks of the disk drive from being subjected to point loading and consequential warping. The uniform distribution exerted on glass disks also prevents cracking or shattering of the glass disk and prevents warping of non-glass disks.

16 Claims, 4 Drawing Sheets

DEFORMABLE RING CLAMPING DEVICE FOR WARP-FREE DISK STACK ASSEMBLY IN A DATA STORAGE DISK DRIVE

FIELD OF THE INVENTION

This invention relates to data storage disk drives and, more specifically, to improved clamping devices for clamping a disk or disk stack onto the hub of such a drive for holding and driving such hub and disks by utilizing a uniform distribution of force on the disk to retain its position relative to the hub, without causing disk warpage or other undue localized stresses.

BACKGROUND OF THE INVENTION

In the assembly of a high-speed, high-capacity data disk drive, it is common to use magnetically recordable disks that are disk substrates coated with a magnetically recordable medium. Due to mass, energy and size design constraints and other design considerations, the disks are made of glass and, therefore, extremely fragile.

The disks are mounted along with spacer rings on a rotatable hub and clamped to the hub to form a disk stack. The clamping has been accomplished by attaching a clamp ring to the hub and tightening a plurality of screws to compress the surfaces of the spacer rings and glass disks into intimate frictional contact. The screws are torqued to substantially equal value. However, the loading of the screw tightening causes a concentration of force at discrete locations around the top of the disk pack. This leads to a non-uniform force distribution exerted on a disk stack necessarily requiring a larger force level on it to hold the disk stack in the desired position in relation to the hub.

Disk warp is commonly induced by non-uniform clamping forces. Disk warp causes non-uniform flight characteristics, such as flight height. Disk warps can cause read/write errors and may cause head crashes damaging the read/write head and/or the magnetically recordable and readable data storage disk. Although a disk may survive the large centrifugal force-loading, disk warp complicates the control of flight characteristics of read/write heads over the disk surfaces due to constantly varying flight height. At such high speeds, the read/write head can not respond quickly enough to insure high quality read/write signals and avoid head crashes.

Even a very minor crack in the disk may cause the disk to fail due to the large centrifugal forces generated by rotating the disk or disk stack at high speed, typically 10,000 to 15,000 revolutions per minute. These forces combine with the stresses in the glass near the stack to cause a disk to break.

A concentration of forces in a limited number of spots about the substrates will increase the likelihood of disk distortions created, such as warps. The creation of stress in one or more of the disks may be sufficient to cause a glass disk to crack and certainly will cause warping in both glass and metal disk substrates, further causing variations in the flight height of the read/write head which is a critical part of any magnetic disk drive.

One very serious problem caused by the warpage is radial track positioning error. An increase or decrease in axial height may cause a shift relative to the data track of as much as a ratio of from 1:8 to 1:10 times the axial height variance, causing improper head tracking of the data track.

Warpage is directly attributable to the number of screws used as point loading sources. The point loads can create not only the number of warps corresponding to the number of point loading sources, but multiple harmonics due to formation of a multiple of warps per point load.

OBJECTS OF THE INVENTION

It is an object of the invention to improve the reliability of data storage disk drives.

It is another object of the invention to fix the disks relative to the hub of a disk drive without subjecting a disk to force concentrations that cause deleterious effects in a disk.

It is a further object of the invention to utilize a substantially uniform force distribution in clamping disks in a disk stack.

It is an additional object of the invention to prevent disk breakage which can result from non-uniform clamping force distribution on a disk and disk stack.

It is a still further object of the invention to reduce or eliminate disk warp associated with the clamp force loading.

It is a still an additional object of the invention to improve the signal quality in reading and/or writing a magnetically recordable and readable disk with data.

BRIEF SUMMARY OF THE INVENTION

In a data storage disk drive, one or more coated glass disks are alternated with a similar number of spacer rings to create a disk stack. This disk stack is positioned around a rotatable hub and clamped to the hub for revolution therewith. Glass disk substrates are preferred for a number of reasons; nevertheless, they are subject to cracking by the concentration of clamping forces at discreet points about a disk. Both metal, such as aluminum, and glass disks may be caused to warp by the point loading, which similarly effects the reliability of the system. The use of glass disks is the preferred embodiment, but it must be understood that the invention also addresses metal or other material disks.

In order to eliminate the clamping force concentrations, this invention provides a clamping assembly which engages the disk stack with a uniformly distributed clamping force.

Two ring-like structures are co-axially juxtaposed with a deformable ring disposed intermediate the rings. The bottom ring is engaged with the top member of the disk stack.

The top ring is attached to the hub by screws that, whenever tightened, force the top ring toward the hub, and thus force the top ring against the deformable ring and against the bottom ring.

The deformable ring is typically constructed of an external elastomeric or other deformable casing such as a thin metal outer casing and contains therein a liquid, gel or free-flowing powdered metal; under pressure, this free-flowing substance will spread the contents to conform to the members which are exerting forces thereon.

As the screws are tightened to create the clamping force required, the contents of the casing are squeezed: subsequently, as pressure is created, the pressure exerts forces on the bottom clamping ring which, in turn, transmits the force to the disk stack.

Sufficient uniform loading of the bottom clamping ring is generated to clamp and fix a disk stack relative to the hub.

By clamping a disk stack with a uniform force loading, the clamping does not introduce non-uniform forces to the disks, thereby not creating those stress concentrations which can cause cracking or disintegration of a disk and possibly a disk stack. Furthermore, any disk warp which is induced by non-uniform force clamping force loading is prevented.

This Summary of the Invention is provided to summarize the disclosure of the invention, however, this Summary of the Invention is not to be used to limit the invention in any manner.

DETAILED DESCRIPTION OF THE BEST MODE OF

THE PREFERRED EMBODIMENT OF THE INVENTION AS CONTEMPLATED BY THE INVENTORS

Figure 1:
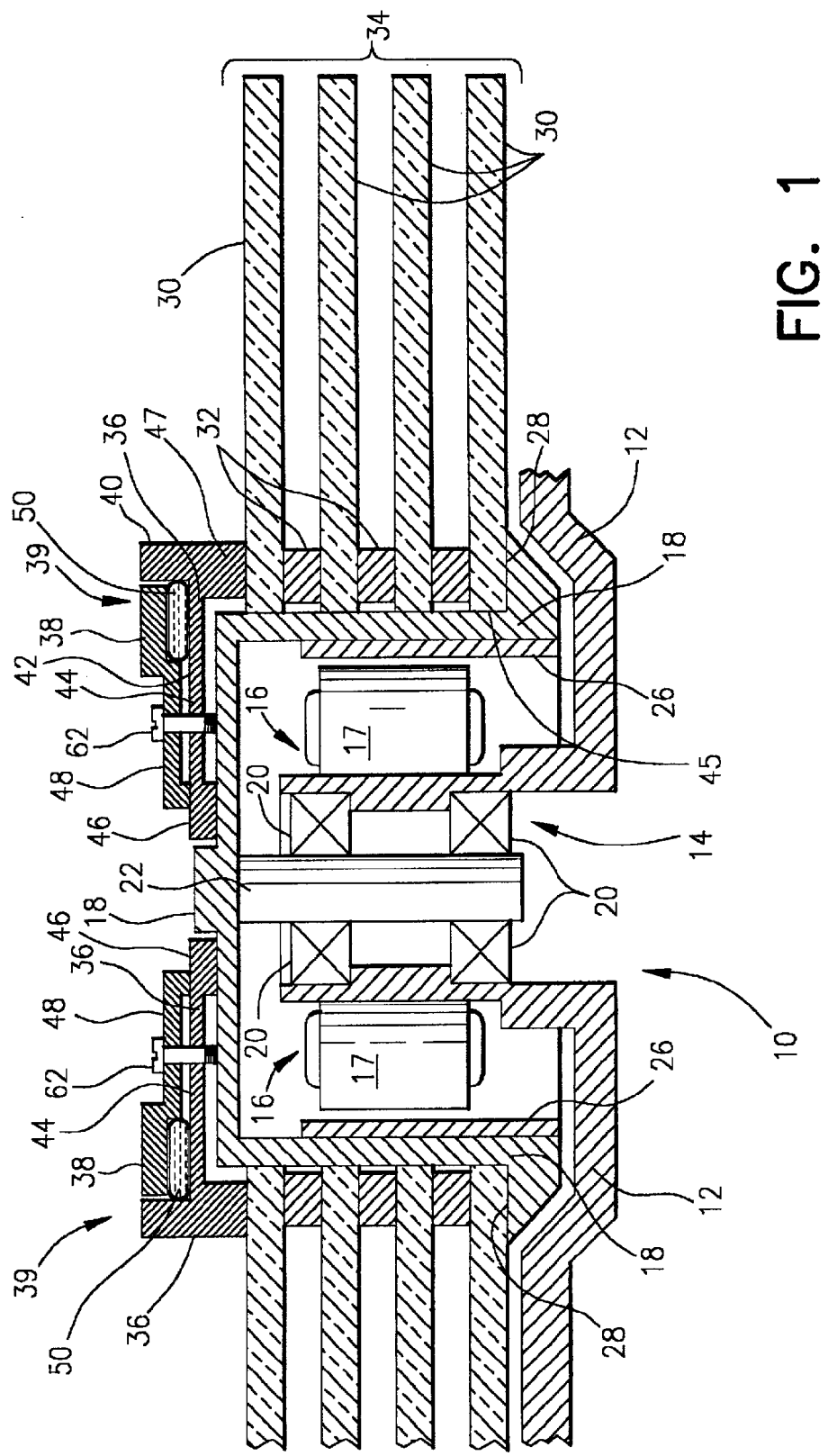
FIG. 1 illustrates a partial data storage disk drive, in partially broken-away form, incorporating a clamping device of the invention actually clamping a disk stack to the hub.

This Detailed Description of the Invention is made with reference to the drawings and initially with specific reference to FIG. 1. FIG. 1 illustrates a section view of a disk drive 10 for data storage. The disk drive 10 is shown without any covers. Further, it should be understood that metal disks as well as glass disks may be clamped by the clamping ring assembly which is a part of the invention, the glass disks being the preferred embodiment.

The disk drive 10 comprises a frame 12 which supports an electric motor 14. The electric motor 14 is comprised of a stator 16 and a rotor 18 or hub 18. The stator 16 is rigidly attached to the frame 12 and, through bearings 20, rotationally supports the rotor 18. Whenever powered, the rotor 18 rotates about its axis relative to the stator 16 and frame 12.

Extending axially from the hub 18 is a shaft 22. Shaft 22 supports a rotor/hub 18 and permits rotary drive forces from the stator magnets 17 to the rotor/hub 18 through the rotor's 18 segmented magnets 26.

The rotor/hub 18 comprises a hollow cylindrical member having an axis of rotation coincident with the axis of rotation of the shaft 22. The rotor/hub 18 further acts as the structure of the motor 14 which supports the segmented magnets 26 which interact conventionally to complete the rotor/hub 18 of the motor 14.

The rotor/hub 18 preferably has a radially extending external flange surface 28 which defines the surface against which a magnetically recordable and readable storage disk 30 is abutted. Disk 30 is formed with a central aperture 45 to fit over the hub 18. If a plurality of disks 30 are incorporated into the disk drive 10, spacer rings 32 and additional disks 30 are alternated to form the disk stack 34.

In order to clamp the disk stack 34 securely to the rotor/hub 18 so that the motor 14 can rotate the disk stack 34 at a steady velocity, a first clamping ring 36 is positioned over the of the uppermost disk 30 of disk stack 34 and further positioned in contact with the topside of the uppermost disk 30.

Figure 2:
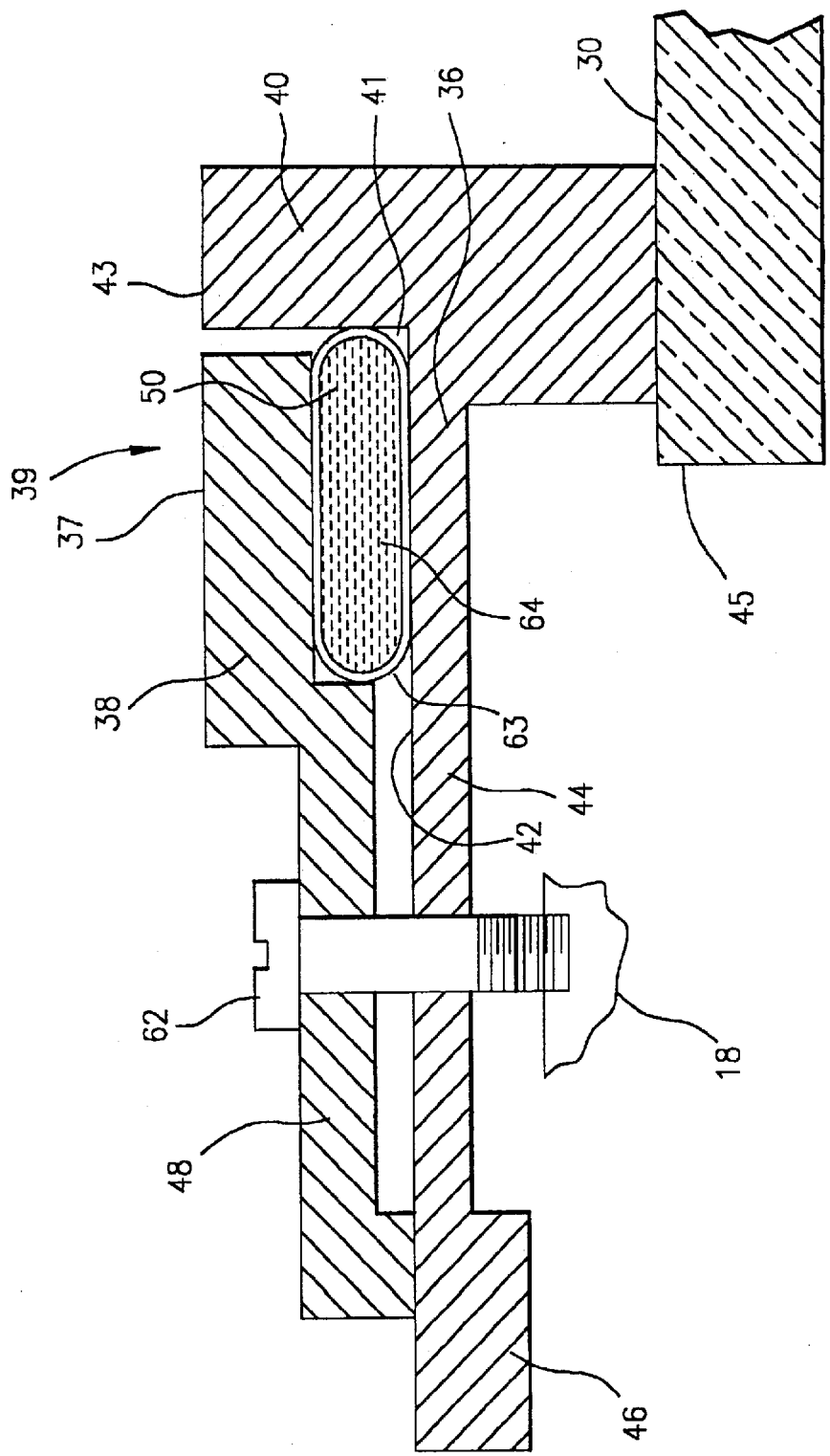
FIG. 2 is a detailed drawing of a portion of a hub, clamping rings, screws, deformable member, and a portion of disk stack incorporating the invention.

The first clamping ring 36 is formed with a cylindrical flange 40 extending co-axially with the shaft 22 from the top surface 42 of the first clamping ring 36, as best viewed in FIGS. 1 and 2. The flange 40 forms a cylinder into which a deformable ring-like or toroidal member 50 is placed so that toroidal member 50 occupies an annular space 41 immediately inward from the cylindrical flange 40. The deformable ring-like member 50 contacts the top surface 42 of the first clamping ring 36.

A plurality of spokes 44 or connecting beams 44 extend from an inner portion 46 of the first clamping ring 36, and the spokes 44 interconnect the inner portion 46 and the outer portion 47 of first clamping ring 36. The spokes 44 or connecting beams 44 maintain the relative concentricity of the inner portion 46 and outer portion 47 of first clamping ring 36.

Figure 3:
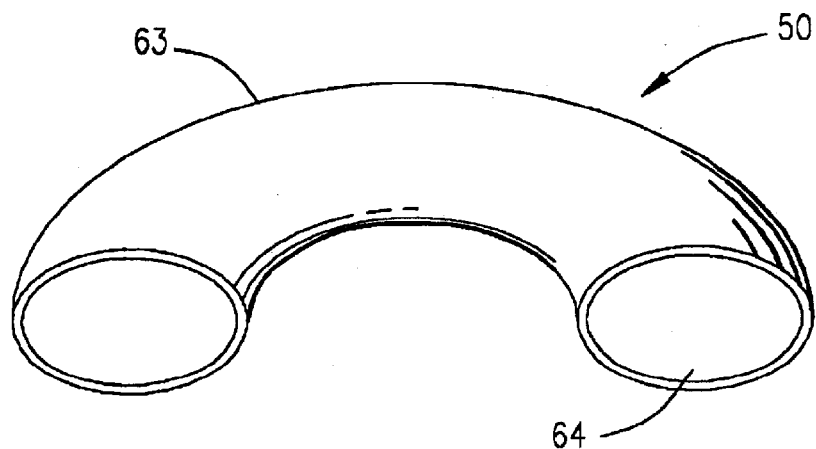
FIG. 3 is an elevated section view of the toroidal deformable ring of the invention.

Referring now to FIGS. 2 and 3, deformable ring 50 is positioned within the cylinder formed by the flange 40. The deformable ring 50 may be one of several types. The preferred construction is a toroid-shaped casing 63 made of an elastomer enclosing a filling such as a gel 64 or other high viscosity fluid 64. As the deformable ring 50 is compressed by the clamping rings 36, 38, an equalizing of pressures within casing 63 occurs and the force exerted by the ring 50 through the first clamping ring 36 onto a disk stack 34 will be uniformly distributed on all areas of contact.

The second clamping ring 38 is biased or forced to compress deformable ring 50 by the screws 62 which extend through spokes 48 of second clamping ring 38, through spokes 44, and threaded into hub 18. Tightening the screws 62 deflects spokes 48 toward hub 18 and forces second clamping ring 38 onto deformable ring 50.

The uniformity of the forces exerted by the first clamping ring 36 onto the disk stack 34 is very important in that non-uniform clamping forces set up stresses within the glass substrates (not shown) of the disks 30. These stresses may be sufficiently large that disks 30 either will crack and/or shatter or else the non-uniformity of the forces may induce warping of the disks 30 even if a disk 30 itself does not crack or shatter.

Figure 4:
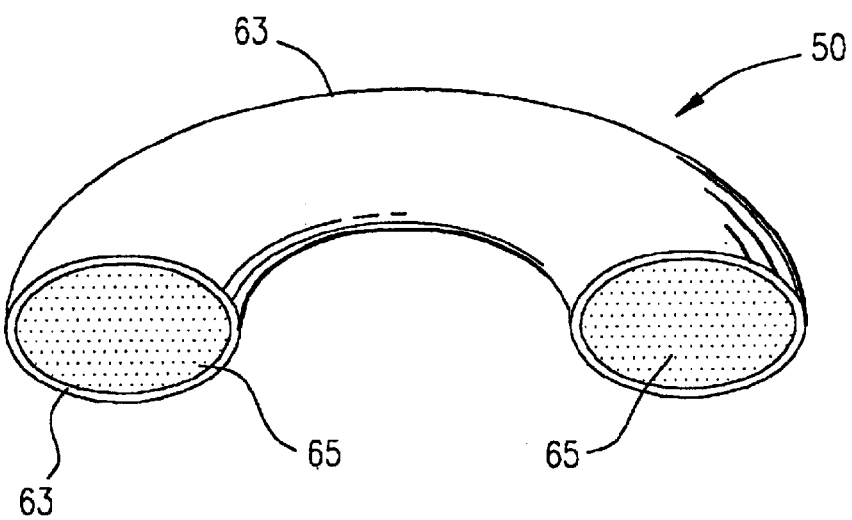
FIG. 4 is an elevated section view of the toroidal deformable ring filled with powdered metal particles.

As illustrated in FIG. 4, another type of deformable ring 50 is an elastomeric outer casing 63 with a charge or filling of powdered metal 65 contained therein. The powdered metal 65 will flow under force to redistribute and equalize forces against the first clamping ring 36 and thus onto the disk stack 34.

Figure 5:
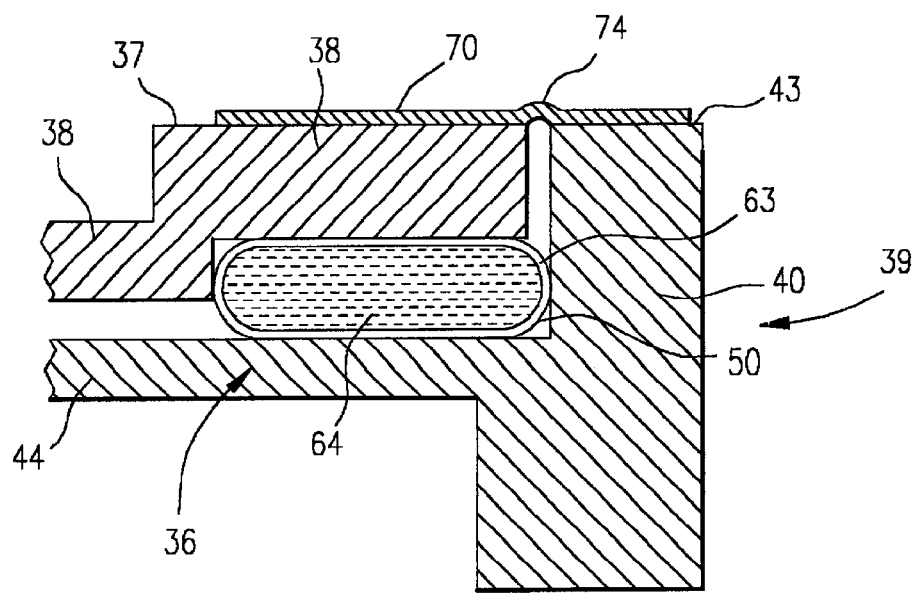
FIG. 5 is a detailed cross-section view of the invention including design of a flexure disk having a corrugation for maintaining concentricity of the clamping rings.

One approach for maintaining concentricity of the clamping rings 36, 38, as illustrated in FIG. 5, is to bond a flexure ring 70 to the top surface 43 of flange ring 40 and to the top surface 37 of the second clamp ring 38.

Figure 6:
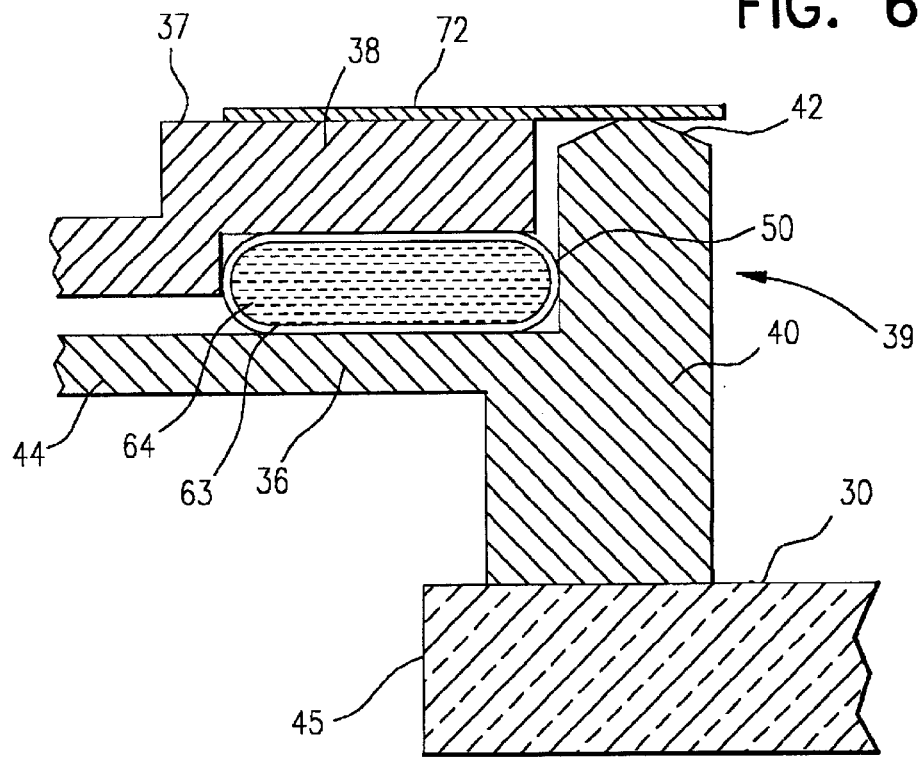
FIG. 6 is a detailed cross-section view of a portion of clamp rings including an alternative design of a flexure disk for maintaining stabilization of the clamping rings relative to each other.

If it is undesirable to bond the flexure ring 70 to the first clamping ring 36, the flexure disk 72 in FIG. 6 may be frictionally engaged with the flange ring 40 or other convenient portion of the clamping ring 36 and permanently attached to the top surface 37 of the second clamp ring 38. This engagement provides a frictional retaining force to maintain radial stability of the clamp rings 36, 38 relative to each other.

In both cases, the flexure ring or disk 70, 72 is a ring designed to leave exposed the screws 62 that are used to produce the clamping forces.

The flexure disk 72 may be planar as in FIG. 6 or may have a corrugation 74 formed therein as in FIG. 5. The corrugation 74 allows limited movement of the respective clamping rings 36, 38 in an axial direction without creating additional stresses on the clamping ring assembly 39.

As can be understood from the foregoing, the prior art "point loading" creates the non-uniform loading on the disk stack 34. The invention overcomes the effect of the several screws 62 providing the clamping forces and redistributes the clamping forces of screws 62 as compression forces distributed uniformly by using the point loadings engaging the spokes 48 of second clamp ring 38 to force the second clamp ring 38 onto the deformable ring 50 and compress the deformable ring 50. This force exertion on first clamp ring 36 is accomplished by the deformable ring 50 without causing distortions and deformations to be created in the first clamp ring 36 and further transmitted to the disk stack 34 and, particularly, to the disks 30 in the disk stack 34. The deformation caused by the point loading of the tightened screws 62 is accommodated in the deformable ring 50.

Moreover, due to the hydrostatic pressure in the liquid or gel filled ring 50 or the equivalent forces in the powdered metal-filled deformable ring 50, the pressure within the deformable ring 50 is further uniformly transmitted to the first clamping ring 36 and retransmitted by the first clamping ring 36 to the components of the disk stack 34. The deformable ring 50 must exhibit substantial resilience and deformability in order to convey the non-uniform force distribution or loading as a uniform clamping load to the disk stack 34 without perpetuating the point loading force distribution of the second clamping ring 38.

While the invention is described as including a deformable ring 50 containing a liquid, gel, or powdered metal particles, it should be understood that other material types having similar properties could be used in lieu thereof.

This Detailed Description is intended to provide sufficient information to one of ordinary skill in the art of disk drives to be able to understand and practice the invention; however, this Detailed Description is not to be used as a basis for limiting the invention in any manner.

This Detailed Description will bring to the mind of a person skilled in the art, modifications and changes of a minor nature; however, these minor changes and modifications shall not remove the modified or changed device for the scope of protection as defined by the claims hereof which define said scope of protection.

We claim:

1. A disk drive having:
    at least one recordable and readable disk;
    a frame;
    an electrical motor supported for rotation by said frame, said electrical motor comprising a stator and a rotor;
    said rotor supported for rotation by said frame;
    a hub member supported by said rotor for rotation therewith;
    said hub member comprising a flange;
    said hub member supporting on said flange said at least one recordable and readable disk having an annular surface area surrounding a central aperture;
    a first clamping ring disposed to exert force onto said annular surface area of said recordable and readable disk and supported on said hub;
    a second clamping ring concentric with and axially deformable relative to said first clamping ring, and
    a deformable ring disposed intermediate said clamping rings, and at least one manually operable holding device interconnecting said clamping rings and said hub for forcing said second clamping ring toward said first ring and toward said hub,
    said deformable ring comprising a deformable exterior and an interior including a fluidic material encased therewithin,
    thereby compressing said deformable ring and exerting substantially equally distributed force on said recordable and readable disk over said annular surface area surrounding said central aperture in said recordable and readable disk,
    whereby the clamping forces generated by said at least one holding device are uniformly distributed to said at least one recordable and readable disk.

2. The disk drive of claim 1 wherein said deformable ring comprises a liquid contained within a deformable casing.

3. The disk drive of claim 2 wherein said manually operated holding device comprises a plurality of screw members engaging said second clamp ring and further is threaded into and engages said hub.

4. The disk drive of claim 2 wherein said deformable ring comprises a deformable exterior covering and an interior filled with a high viscosity gel.

5. The disk drive of claim 4 wherein said deformable ring is an elastomeric ring.

6. The disk drive of claim 2 wherein said deformable ring comprises a toroidal shape.

7. The disk drive of claim 1 wherein said deformable ring comprises a deformable exterior covering and an interior filed with a high viscosity gel.

8. The disk drive of claim 1 wherein said deformable ring comprises an elastomeric casing and a filling of metal powder.

9. The disk drive of claim 1 wherein said deformable ring comprises a plurality of free-flowing spherical elements contained within a deformable casing.

10. The disk drive of claim 9 wherein said manually operated holding device comprises a plurality of screw members engaging said second clamp ring and further threaded into and engages said hub.

11. The disk drive of claim 9 wherein said deformable ring comprises a toroidal shape.

12. A disk drive having at least one recordable and readable disk comprising:
    a frame;
    an electrical motor supported for rotation by said frame, said electrical motor comprising a stator and a rotor;
    said rotor supported for rotation by said frame;
    a hub member supported by said rotor for rotation therewith;
    said hub member comprising a flange;
    said hub member supporting thereon said at least one recordable and readable disk having an annular surface area surrounding a central aperture;
    said recordable and readable disk engaging said flange;
    a first clamping ring disposed to exert force onto said annular surface area of said recordable and readable disk and supported on said hub;
    a second clamping ring concentric with and axially deformable relative to said first clamping ring, and
    a deformable ring disposed intermediate said clamping rings, said deformable ring comprising a fluidic material and an enclosing outer casing surrounding said fluidic material, and,
    a compression and holding member engaging said hub and said second clamping ring to displace said second clamping ring and moveable relative to said hub and said second clamping to displace said second clamping ring toward said first clamping ring, thereby compressing said deformable ring, causing equalized force to be distributed through said deformable ring to said first clamping ring.

13. The disk drive of claim 12 wherein said first and said second clamping rings each comprise an opposing axially extending flange defining walls of an annular chamber for containment of said deformable ring.

14. The disk drive of claim 12 wherein said deformable ring comprises an elastomeric casing and a filling of metal powder.

15. The disk drive of claim 12 wherein said deformable ring comprises a deformable exterior covering and an interior filled with a high viscosity gel.

16. The disk drive of claim 12 wherein said deformable ring comprises an elastomeric cover and a fluidic filling within said cover.

* * * * *